US008713665B2

(12) United States Patent
Hamilton, II et al.

(10) Patent No.: US 8,713,665 B2
(45) Date of Patent: *Apr. 29, 2014

(54) SYSTEMS, METHODS, AND MEDIA FOR FIREWALL CONTROL VIA REMOTE SYSTEM INFORMATION

(75) Inventors: Rick A. Hamilton, II, Charlottesville, VA (US); Brian M. O'Connell, Cary, NC (US); John R. Pavesi, Cedar Park, TX (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/602,362

(22) Filed: Sep. 4, 2012

(65) Prior Publication Data

US 2012/0331541 A1 Dec. 27, 2012

Related U.S. Application Data

(63) Continuation of application No. 11/765,004, filed on Jun. 19, 2007, now Pat. No. 8,327,430.

(51) Int. Cl.
*H04L 29/06* (2006.01)
(52) U.S. Cl.
CPC ............... *H04L 63/0254* (2013.01); *H04L 63/0263* (2013.01)
USPC .................. 726/11; 726/12; 726/13; 726/14; 726/15; 713/151; 713/152; 713/153
(58) Field of Classification Search
CPC .................................................. H04L 63/0254
USPC ......................................................... 726/11
See application file for complete search history.

(56) References Cited

U.S. PATENT DOCUMENTS

| 6,161,182 A | 12/2000 | Nadooshan |
| 6,219,790 B1 | 4/2001 | Lloyd et al. |

(Continued)

FOREIGN PATENT DOCUMENTS

| EP | 1465382 | 10/2007 |
| JP | 11355267 | 12/1999 |

(Continued)

OTHER PUBLICATIONS

International Search Report including transmittal with PCT Written Opinion of International Searching Authority, From the International Searching Authority, mailed May 20, 2009; Applicant: International Business Machines Corporation, International Application No. PCT/EP2008/056192; 9 pages.

(Continued)

*Primary Examiner* — Longbit Chai
(74) *Attorney, Agent, or Firm* — Schmeiser, Olsen & Watts, LLP; Mark C. Vallone (57) ABSTRACT

A method and system for controlling a firewall for a user computer system. One or more processors of the user computer system receive a control request to control a program of the user computer system by the firewall. The control request includes a condition pertaining to at least one process of a remote computer system. The at least one process is configured to be executed on the remote computer system. The firewall protects the user computer system from external threats. The processors store a remote system condition associated with the program of the user computer system. The remote system condition includes the condition pertaining to the at least one process. The processors ascertain whether the remote system condition is satisfied. The processors direct the firewall to block or allow the transmission of data if it is ascertained that the remote system condition is not satisfied or satisfied, respectively.

20 Claims, 7 Drawing Sheets

(56) References Cited

U.S. PATENT DOCUMENTS

| | | | |
|---|---|---|---|
| 6,584,505 | B1 | 6/2003 | Howard et al. |
| 6,651,096 | B1 | 11/2003 | Gai et al. |
| 6,754,820 | B1 | 6/2004 | Scheidt et al. |
| 7,039,812 | B2 | 5/2006 | Kawan et al. |
| 7,054,944 | B2 | 5/2006 | Tang et al. |
| 7,082,532 | B1 | 7/2006 | Vick et al. |
| 7,085,934 | B1 | 8/2006 | Edwards |
| 7,162,649 | B1 | 1/2007 | Ide et al. |
| 7,546,629 | B2 | 6/2009 | Albert et al. |
| 7,603,472 | B2 * | 10/2009 | Petry et al. ............... 709/230 |
| 7,634,800 | B2 | 12/2009 | Ide et al. |
| 8,201,180 | B2 * | 6/2012 | Briscoe et al. ............ 718/104 |
| 8,272,041 | B2 | 9/2012 | Hamilton et al. |
| 8,272,043 | B2 | 9/2012 | Hamilton et al. |
| 8,327,430 | B2 | 12/2012 | Hamilton et al. |
| 2002/0002688 | A1 | 1/2002 | Gregg et al. |
| 2002/0112155 | A1 | 8/2002 | Martherus et al. |
| 2002/0133719 | A1 | 9/2002 | Westerdal |
| 2003/0055962 | A1 * | 3/2003 | Freund et al. ............. 709/225 |
| 2003/0177389 | A1 * | 9/2003 | Albert et al. ............. 713/201 |
| 2004/0078591 | A1 | 4/2004 | Teixeira et al. |
| 2004/0103317 | A1 | 5/2004 | Burns |
| 2004/0128393 | A1 | 7/2004 | Blakely et al. |
| 2004/0187029 | A1 | 9/2004 | Ting |
| 2005/0055578 | A1 | 3/2005 | Wright et al. |
| 2005/0102244 | A1 | 5/2005 | Dickinson |
| 2005/0177869 | A1 | 8/2005 | Savage et al. |
| 2006/0005254 | A1 | 1/2006 | Ross |
| 2006/0155681 | A1 | 7/2006 | Chiang et al. |
| 2006/0265412 | A1 | 11/2006 | Griffiths et al. |
| 2007/0150553 | A1 | 6/2007 | Fields et al. |
| 2007/0172808 | A1 | 7/2007 | Capone |
| 2008/0019352 | A1 | 1/2008 | Bennett |
| 2008/0178260 | A1 | 7/2008 | Schwarz et al. |
| 2008/0271117 | A1 | 10/2008 | Hamilton, II et al. |
| 2008/0320580 | A1 | 12/2008 | Hamilton, II et al. |
| 2008/0320581 | A1 | 12/2008 | Hamilton, II et al. |
| 2008/0320584 | A1 | 12/2008 | Hamilton, II et al. |

FOREIGN PATENT DOCUMENTS

| | | |
|---|---|---|
| JP | 2000259567 | 9/2000 |
| JP | 2002183089 | 6/2002 |
| JP | 2004206258 | 7/2004 |
| JP | 2006035631 | 2/2006 |
| WO | 02/03178 | 1/2002 |
| WO | 02/37728 | 5/2002 |
| WO | 2004034672 | 2/2004 |

OTHER PUBLICATIONS

International Search Report including transmittal with PCT Written Opinion of International Searching Authority, From the International Searching Authority, mailed Nov. 5, 2008; Applicant: International Business Machines Corporation, International Application No. PCT/EP2008/057937; 10 pages.

International Search Report including transmittal with PCT Written Opinion of International Searching Authority, From the International Searching Authority, mailed Feb. 23, 2009; Applicant: International Business Machines Corporation, International Application No. PCT/EP2008/057938; 9 pages.

International Search Report including transmittal with PCT Written Opinion of International Searching Authority, From the International Searching Authority, mailed Jul. 18, 2008; Applicant: International Business Machines Corporation, International Application No. PCT/EP2008/054412; 13 pages.

Haffner, Ernst-Georg, et al., "Managing Distributed Personal Firewalls with Smart Data Servers," World Conference on WWW and Internet [Online]2001, Retrieved from the Internet: URL: http:/wiki.uni.lu/secan-lab/Haffner2001.pdf; 6 pages.

Office Action (Mail Date 10/18/20101) for U.S. Appl. No. 11/741,516, filed Apr. 27, 2007.

Amendment filed Feb. 23, 2011 in response to Office Action (Mail Date 10/18/20101) for U.S. Appl. No. 11/741,516, filed Apr. 27, 2007.

Final Office Action (Mail Date May 11, 2011) for U.S. Appl. No. 11/741,516, filed Apr. 27, 2007.

Amendment and Request for Continued Examination filed Aug. 9, 2011 in response to Final Office Action (Mail Date May 11, 2011) for U.S. Appl. No. 11/741,516, filed Apr. 27, 2007.

Office Action (Mail Date Apr. 29, 2010) for U.S. Appl. No. 11/765,004, filed Jun. 21, 2007.

Amendment filed Jul. 28, 2010 in response to Office Action (Mail Date Apr. 29, 2010) for U.S. Appl. No. 11/765,004, filed Jun. 21, 2007.

Final Office Action (Mail Date Sep. 13, 2010) for U.S. Appl. No. 11/765,004, filed Jun. 21, 2007.

Request for Continued Examination and Amendment filed Feb. 14, 2011 in response Final Office Action (Mail Date Sep. 13, 2010) for U.S. Appl. No. 11/765,004, filed Jun. 21, 2007.

Office Action (Mail Date Jan. 11, 2012) for U.S. Appl. No. 11/765,004, filed Jun. 21, 2007.

Amendment filed Apr. 9, 2012 in response to Office Action (Mail Date Jan. 11, 2012) for U.S. Appl. No. 11/765,004, filed Jun. 21, 2007.

Final Office Action (Mail Date Apr. 16, 2012) for U.S. Appl. No. 11/765,004, filed Jun. 21, 2007.

Amendment filed May 31, 2012 in response to Final Office Action (Mail Date Apr. 16, 2012) for U.S. Appl. No. 11/765,004, filed Jun. 21, 2007.

Notice of Allowance (Mail Date Jun. 8, 2012) for U.S. Appl. No. 11/765,004, filed Jun. 21, 2007.

Office Action (Mail date May 27, 2010) for U.S. Appl. No. 11/766,146, filed Jun. 21, 2007.

Amendment filed Aug. 23, 2010 in response to Office Action (Mail Date May 27, 2010) for U.S. Appl. No. 11/766,146, filed Jun. 21, 2007.

Final Office Action (Mail Date Oct. 19, 2010) for U.S. Appl. No. 11/766,146, filed Jun. 21, 2007.

Request for Continued Examination and Amendment filed Feb. 17, 2011 in response to Final Office Action (Mail Date Oct. 19, 2010) for U.S. Appl. No. 11/766,146, filed Jun. 21, 2007.

Office Action (Mail Date Feb. 1, 2012) for U.S. Appl. No. 11/766,146, filed Jun. 21, 2007.

Amendment filed Apr. 24, 2012 in response to Office Action (Mail Date Feb. 1, 2012) for U.S. Appl. No. 11/766,146, filed Jun. 21, 2007.

Notice of Allowance (Mail Date May 11, 2012) for U.S. Appl. No. 11/766,146, filed Jun. 21, 2007.

Office Action (Mail Date May 13, 2012) for U.S. Appl. No. 11/766,165, filed Jun. 21, 2007.

Amendment filed Aug. 10, 2010 in response to Office Action (Mail Date May 13, 2012) for U.S. Appl. No. 11/766,165, filed Jun. 21, 2007.

Final Office Action (Mail Date Sep. 23, 2010) for U.S. Appl. No. 11/766,165, filing date Jun. 21, 2007.

Request for Continued Examination and Amendment filed Jan. 24, 2011 in response to Final Office Action (Mail Date Sep. 23, 2010) for U.S. Appl. No. 11/766,165, filed Jun. 21, 2007.

Office Action (Mail Date Feb. 1, 2012) for U.S. Appl. No. 11/766,165, filed Jun. 21, 2007.

Amendment filed Apr. 24, 2012 in response to Office Action (Mail Date Feb. 1, 2012) for U.S. Appl. No. 11/765,165, filed Jun. 21, 2007.

Notice of Allowance (Mail Date May 9, 2012) for U.S. Appl. No. 11/765,165, filed Jun. 21, 2007.

Notice of Allowance (Mail Date Oct. 7, 2013) for U.S. Appl. No. 11/741,516, filed Apr. 27, 2007.

* cited by examiner

SYSTEMS, METHODS, AND MEDIA FOR FIREWALL CONTROL VIA REMOTE SYSTEM INFORMATION

This application is a continuation application claiming priority to Ser. No. 11/765,004, filed Jun. 19, 2007, now U.S. Pat. No. 8,327,430, issued Dec. 4, 2012.

FIELD OF INVENTION

The present invention is in the field of data processing systems and, in particular, to systems, methods and media for implementing a firewall control system responsive to remote system information.

BACKGROUND

Computer systems are well known in the art and have attained widespread use for providing computer power to many segments of today's modern society. As advances in semiconductor processing and computer architecture continue to push the performance of computer hardware higher, more sophisticated computer software has evolved to take advantage of the higher performance of the hardware, resulting in computer systems that continue to increase in complexity and power. Computer systems have thus evolved into extremely sophisticated devices that may be found in many different settings. Computer systems are often connected to the Internet or other broad-based network in order to communicate with other computer systems, access information or other resources, or perform various tasks associated with business, personal banking, electronic commerce transactions, or other endeavors. Connection to other systems via the Internet, however, brings with it the risk of compromise of the computer system and the data located on it from viruses, worms, Trojan horses, hackers, or other types of attacks. System developers often utilize firewalls that control traffic to and from a network to help protect the computer systems from outside attack and to otherwise control information flow to and from a computer system.

Firewall products, which are often distributed as software application programs, can be considered to fall into one of two broad categories: corporate network firewalls and personal firewalls. Corporate network firewalls (also referred to as sub-net firewalls or non-personal firewalls) monitor traffic at a network bottleneck, such as at a point where a corporate intranet interfaces to the Internet. At this position, all of the computers on the corporate intranet can be protected from threats outside the intranet originating from the Internet. This is a cost effective and efficient solution for corporations or other organizations as firewall products need only be installed and administered at the one or more key networking interfaces between the intranet(s) and the Internet. Corporate network firewalls may also monitor traffic at a network bottleneck, such as at a point where a general corporate network interfaces with a high-security corporate network, such as at a lab or research organization.

The second broad category of firewall product is a "personal" firewall that runs directly on a computer system. Some are distributed or provided as a separate application program, while others, such as Microsoft Corporation's Microsoft® Windows firewall are embedded in an operating system. While a personal firewall protects the computer system from threats coming from its wireless or wired network interfaces, its configuration, preferences, and performance is typically limited when compared to a corporate network firewall.

These software firewalls provide some customizable ability to restrict, allow, or monitor attempts of a particular program to send or receive data. Currently these decisions may be responsive to the network subnet the user is currently connected to, the day or time, whether requested data is inbound or outbound, whether the requested data is of a certain protocol (TCP, UDP, TCP and UDP, and ICMP), the port number to receive or send data through, the IP address or network the requested data is being sent to or received from, and the user's network adapter being used. One solution used in locations with WiFi access requires users to authenticate via a browser (such as by making payment with a credit card) before being able to use the WiFi connection. This solution requires the user to know which program to launch first in order to authenticate and only provides a simple block/no-block firewall response. Such solutions, accordingly, provide a relatively broad level of control, but do not provide for a more sophisticated, precise control of data packets going through the firewall.

SUMMARY OF THE INVENTION

The problems identified above are in large part addressed by systems, methods and media for implementing a firewall control system responsive to remote system information. A method for controlling a firewall for a user computer system is disclosed. Embodiments of the method may include receiving a data request at a firewall where the data request is associated with a program and determining whether a remote system condition exists for the associated program, where the remote system condition includes a condition to be satisfied based on information received from a particular remote system. Embodiments may also include, in response to determining that a remote system condition exists, determining whether the remote system condition is satisfied based on information received from the particular remote system. Embodiments may also include, in response to determining whether the remote system condition is satisfied, performing one or more firewall actions.

Another embodiment provides a computer program product comprising a computer-useable medium having a computer readable program wherein the computer readable program, when executed on a computer, causes the computer to perform a series of operations for controlling a firewall. The series of operations generally includes receiving a data request at a firewall where the data request is associated with a program and determining whether a remote system condition exists for the associated program, where the remote system condition includes a condition to be satisfied based on information received from a particular remote system. Embodiments of the series of operations may also include, in response to determining that a remote system condition exists, determining whether the remote system condition is satisfied based on information received from the particular remote system. Embodiments of the series of operations may also include, in response to determining whether the remote system condition is satisfied, performing one or more firewall actions.

A further embodiment provides a firewall system implemented on a computer system. The firewall system may include a network stack to interrogate incoming and outgoing data packets and to apply one or more firewall rules against them to allow or deny access by the data packets to a program of a user computer system. The firewall system may also include a remote system controller in communication with the network stack to further control access to data packets. The remote system controller may include a remote system listener, a store interface module, a condition analyzer, and a firewall action manager. The remote system listener may receive information from a remote system. The store interface module may access remote system conditions associated with particular programs of the user computer system, where the remote system conditions include conditions to be satisfied for particular programs of the user computer system. The condition analyzer may determine whether the remote system conditions are satisfied based on information received from a remote system. The firewall action manager may perform one or more firewall actions in response to a determination of whether remote system conditions are satisfied.

BRIEF DESCRIPTION OF THE DRAWINGS

Aspects of certain embodiments of the invention will become apparent upon reading the following detailed description and upon reference to the accompanying drawings in which like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for implementing a firewall control system responsive to remote system information are disclosed. Embodiments of a method may include receiving a data request at a firewall where the data request is associated with a program and determining whether a remote system condition exists for the associated program, where the remote system condition includes a condition to be satisfied based on information received from a particular remote system. Embodiments may also include, in response to determining that a remote system condition exists, determining whether the remote system condition is satisfied based on information received from the particular remote system. Embodiments may also include, in response to determining whether the remote system condition is satisfied, performing one or more firewall actions.

The system and methodology of the disclosed embodiments allow for effective and efficient control of a firewall by utilizing information from a remote system to "fine-tune" firewall control for particular programs of the user computer system. Firewalls according to the disclosed embodiments are given the ability (via a new program control component) to acquire information from a remote system in order to facilitate performance of firewall actions such as allowing or denying access, redirecting data packets to another system, or beginning monitoring in response. Firewalls may thus be controlled with increased sophistication, particularly with respect to controlling firewall usage related to individual programs. Data flow to and from a particular program may thus be controlled based on the status or other information from other, remote computer systems. A firewall, in one example, may block data from a particular e-mail client if an enterprise spam blocker or virus scanner is not running or it has definition files older than one week, thus allowing the firewall to control access to a program on a user computer system because of a status of a separate server computer system. The disclosed system may be useful for all types of software firewalls, including personal and non-personal (network) firewalls.

In general, the routines executed to implement the embodiments of the invention may be part of a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware, software systems, manual operations, or any combination of any or all of these. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Moreover, embodiments of the invention may also be implemented via parallel processing using a parallel computing architecture, such as one using multiple discrete systems (e.g., plurality of computers, etc.) or an internal multiprocessing architecture (e.g., a single system with parallel processing capabilities).

Aspects of embodiments of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a physically tangible computer-readable storage medium providing program code for use by or in connection with a computer or any instruction execution system. For the purposes of this description, a computer-usable or computer readable storage medium can be any apparatus or device or memory that can store the program for use by or in connection with the instruction execution system, apparatus, or device. The storage medium may be an electronic, magnetic, optical, or semiconductor system (or apparatus or device). Examples of a computer-readable storage medium or device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Figure 1:
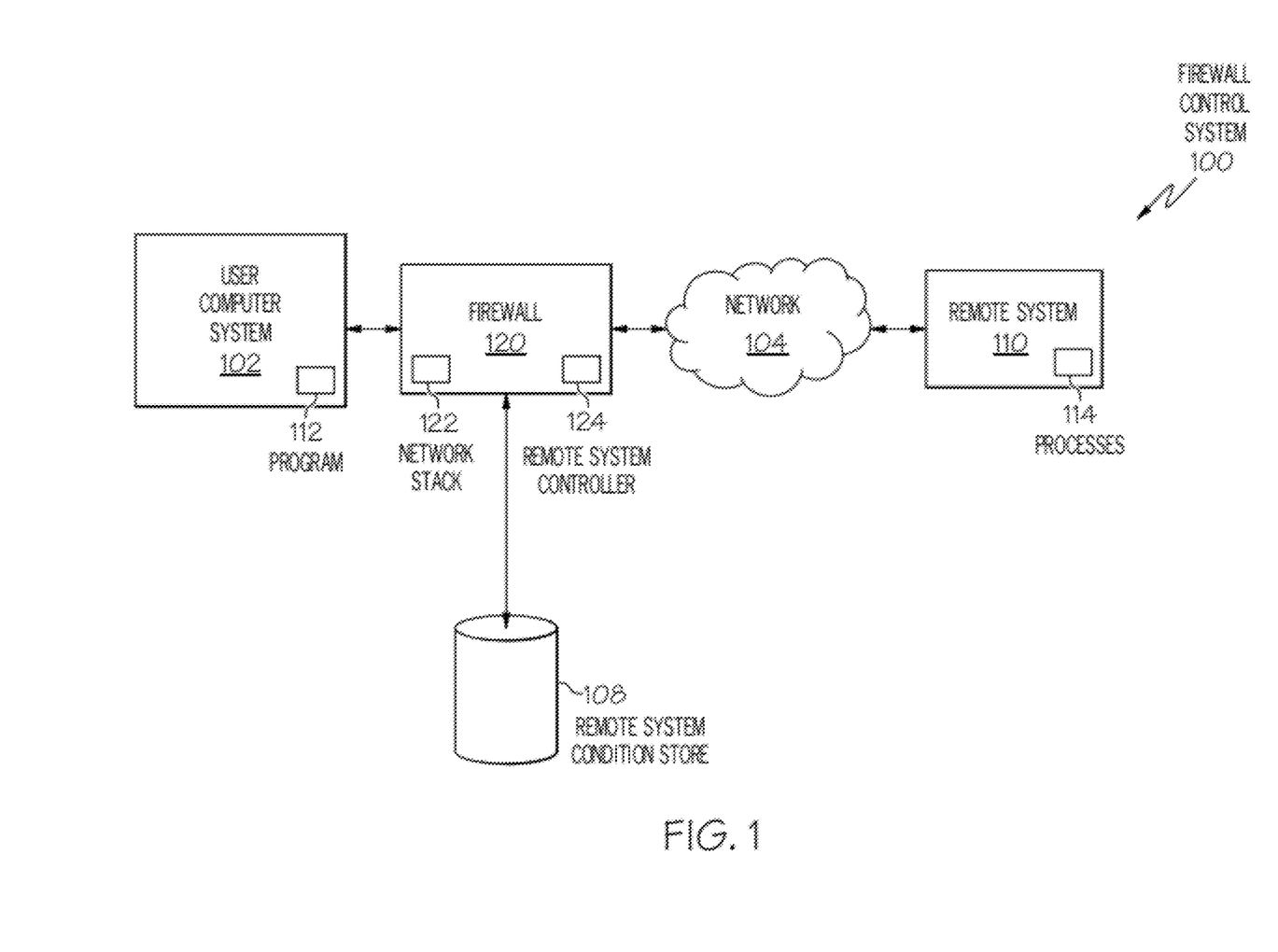
FIG. 1 depicts an environment for a firewall control system with a user computer system, firewall with remote system controller, and a remote system condition store according to some embodiments.

Turning now to the drawings, FIG. 1 depicts an environment for a firewall control system with a user computer system, firewall with remote system controller, and a remote system condition store according to some embodiments. In the depicted embodiment, the firewall control system 100 includes a user computer system 102 in communication with a network 104 through firewall 120. The user computer system 102 may include one or more programs 112 to send or receive information to and from network 104. As will be described in more detail subsequently, the firewall 120 may control data to and from a particular program 112 based on information obtained from a remote system 110 by comparing such information with a remote system condition associated with the relevant program 112. The firewall 120 may be in communication with the remote system 110 via network 104 or other means. The firewall 120 may also be in communication with a remote system condition store 108 (that includes information about remote system conditions for a particular program 112) directly, via network 104, or other connection, or the remote system condition store 108 may be included within firewall 120 or one of its components.

Users may utilize a user computer system 102 according to the present embodiments to access network 104 via firewall 120 for transmitting and receiving information. User computer system 102 may be a personal computer system or other computer system adapted to execute computer programs, such as a personal computer, workstation, server, notebook or laptop computer, desktop computer, personal digital assistant (PDA), mobile phone, wireless device, or set-top box, such as described in relation to FIG. 2. A user of the user computer system 102 may utilize programs 112 during the course of their normal usage or such programs 112 may execute automatically or without user intervention. Transmission and receipt of data packets to and from a program 112 may advantageously be controlled by firewall 120, as described in more detail subsequently. Programs 112 may include any type of software application, including browsers, P2P clients, e-mail programs, file transfer programs, desktop applications, Internet telephony applications, remote control applications, video conference applications, or any other type of application. A user may, for example, interact with the user computer system 102 via a user interface to configure remote system conditions associated with a particular program 112.

Network 104 may be any type of data communications channel or combination of channels, such as the Internet, an intranet, a LAN, a WAN, an Ethernet network, a wireless network, telephone network, a proprietary network, or a broadband cable network. In one example, the Internet may serve as network 104 and the firewall 120 may protect the user computer system 102 from Internet-based threats. Those skilled in the art will recognize, however, that the invention described herein may be implemented utilizing any type or combination of data communications channel(s) without departure from the scope and spirit of the invention.

Figure 2:
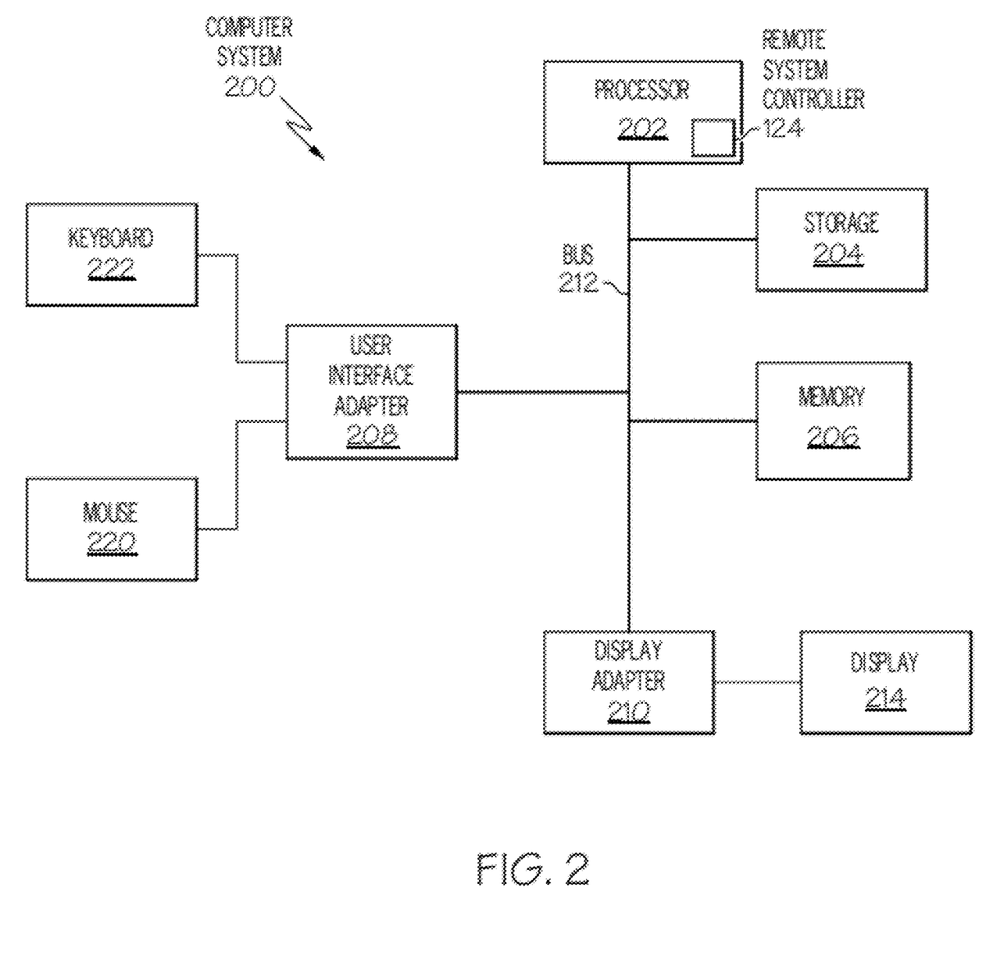
FIG. 2 depicts a block diagram of one embodiment of a computer system suitable for use as a component of the firewall control system, such as a user computer system or a remote system.

Remote system 110 may be a personal computer system or other computer system adapted to execute computer programs, such as a personal computer, workstation, server, notebook or laptop computer, desktop computer, personal digital assistant (PDA), mobile phone, wireless device, or set-top box, such as described in relation to FIG. 2. The remote system 110 may thus be any computer system separate from the user computer system 102 being protected by firewall 120. One or more processes 114 may be executing on the remote system 110. Processes 114 may include any software process executing on a processor or resident of memory of the user computer system 102, and may include processes 114 associated with anti-virus or other security programs, operation system processes, or any other processes. Information about the processes 114 (e.g., whether they are running or not, which data files they are accessing, etc.) may be used according to the present embodiments in determining whether remote system conditions are met.

Firewall 120 may be a software firewall implemented on a computer system such as user computer system 102 (for a personal firewall) or a server computer system (such as for a corporate firewall). Example firewalls include those from Symantec Corp., Check Point® Software Technologies Ltd., Microsoft Corp., McAfee Inc., and Lavasoft. Non-personal firewall vendors include companies such as Cisco Systems Inc., NetGear, Inc., Linksys® (a division of Cisco Systems, Inc.), and TRENDnet. As described previously, firewall 120 may control the flow of data packets between a user computer system 102 and the network 104. Firewall 120 may include a network stack 122 and a process interrogation controller 124. The network stack 122 is a component of the firewall software that interrogates incoming and outgoing data packets and applies various firewall rules against them to either allow or deny the packet access to and from the host. Firewall rules include allowing or denying packet access based on the network subnet the user is currently connected to, the day or time, whether requested data is inbound or outbound, whether the requested data is of a certain protocol (TCP, UDP, TCP and UDP, and ICMP), the port number to receive or send data through, the IP address or network the requested data is being sent to or received from, and the user's network adapter being used.

Figure 3:
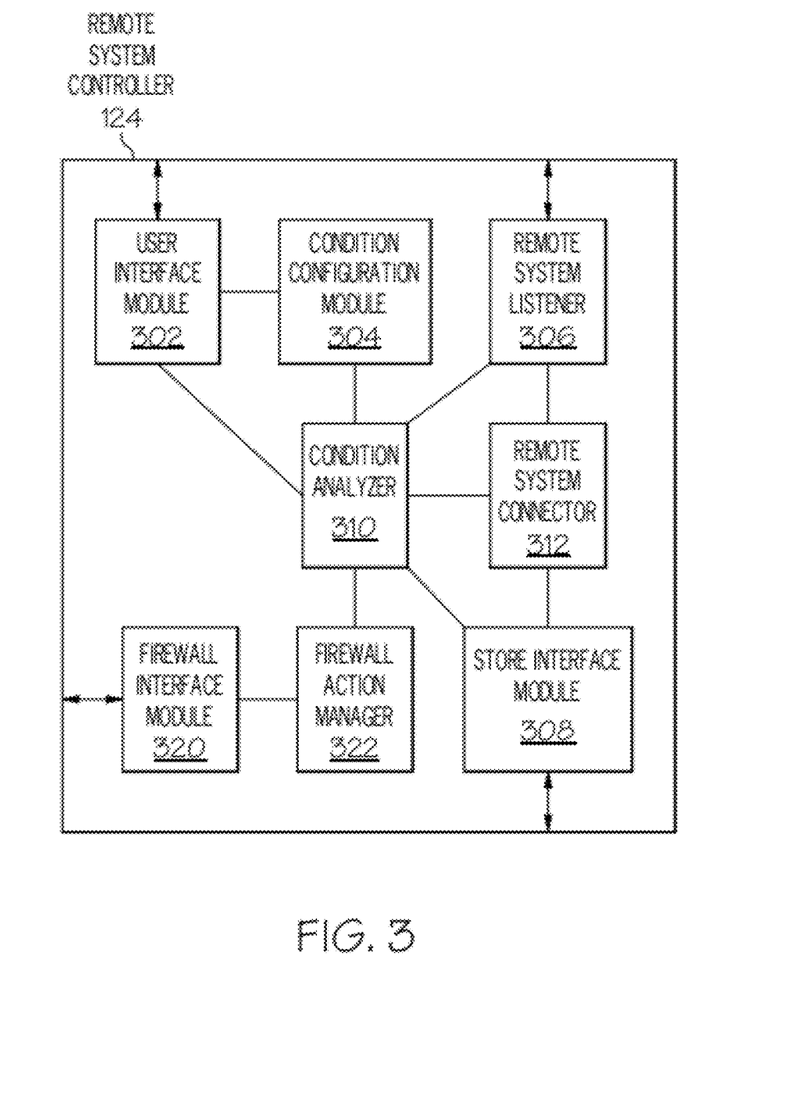
FIG. 3 depicts a conceptual illustration of software components of a remote system controller according to some embodiments.

The remote system controller 124, as described in more detail in relation to FIG. 3, may communicate with the network stack 122 and may provide further control of access to data packets according to the disclosed embodiments. Data packets may each have an associated program 112 that is transmitting or receiving the data packet. The remote system controller 124 may determine for a particular data packet whether a stored remote system condition exists for the program 112 associated with the data packet, where the stored remote system condition would include one or more conditions of a particular remote system 110 to be satisfied. The remote system controller 124 may then receive or otherwise access remote system information from the particular remote system 110 to determine whether the remote system condition is satisfied. In response to such determination (whether satisfied or not satisfied), the remote system controller 124 may also perform one or more firewall actions, such as by limiting data to and from a program 112 if certain remote system conditions are not met.

Remote system condition store 108 may include any type or combination of storage devices, including volatile or non-volatile storage such as hard drives, storage area networks, memory, fixed or removable storage, or other storage devices. The remote system condition store 108 in some embodiments may be an encrypted database of process rules for particular programs 112 of a user computer system 102. The remote system condition store 108 may be located in a variety of positions with the firewall control system 100, such as being a stand-alone component (perhaps implemented by a trusted third party on a remote server or network of servers) or as part of the user computer system 102 or firewall 120.

The remote system controller 124 may be implemented on any kind of firewall 120, including both personal firewalls and corporate, multi-user firewalls. For a personal firewall, the firewall 120 and remote system controller 124 may execute on the user computer system 102 that the firewall 120 is protecting. In these embodiments, the remote system 110 may be an enterprise or corporate server with which the user computer system 102 is associated (e.g., a corporate server of the user's employer). For non-personal firewalls (such as corporate firewall appliances and router firewalls) that protect multiple user computer systems 102, the remote system controller 124 may need to query other remote servers in order to acquire remote system information, enabling the non-personal firewall to perform the disclosed functionality. A corporate or other organizational implementation may provide an efficient means of modifying conditions or rules and applying them to any programs 112 for a wide variety of users. How data flow to and from a particular program 112 is best handled, for example, may differ for an administrator and a regular user.

Various non-limiting examples may serve to further illustrate the disclosed firewall control system 100. In one example, the remote system controller 124 may block data to and from some or all programs 112 on computers within affected subnets if a security monitoring process is not running on a server cluster in the enterprise. In another example, a remote system controller 124 may block data to and from client programs 112 if one or more server program processes 114 are not running on remote systems 110. This example may be particularly useful when a process 114 is not required for a program 112 from a technical perspective but is desirable from a business or organizational perspective. In another example previously discussed, the remote system controller 124 may block data to and from an e-mail client program 112 if an enterprise spam blocker or virus scanner is not running on a remote server or if it has definition files older than a specified timeframe, such as one week. Yet another example would include blocking data to and from a remote control client program 112 if a process running on the server is occupying over 80% of the CPU resources or if a game or other resource-intensive application is currently running on the remote system 110.

FIG. 2 depicts a block diagram of one embodiment of a computer system 200 suitable for use as a component of the firewall control system 100, such as a user computer system 102 or a remote system 110. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200. Computer system 200 may be utilized to implement the user computer system 102, remote system 110, firewall 120 and/or remote system condition store 108.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the firewall 120 (including the remote system controller 124), such as by receiving information from the remote system 110 and analyzing the results in comparison to a remote system condition, and may temporarily or permanently store information during its calculations or results after calculations in storage 204 or memory 206. All or part of the remote system controller 124, for example, may be stored in memory 206 during execution of its routines.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A user of a user computer system 102 requesting an application 112 to send data, for example, may utilize the keyboard 222 and mouse 220 to interact with their computer system. The bus 212 may also connect the processor 202 to a display, such as an LCD display or CRT monitor, via the display adapter 210.

FIG. 3 depicts a conceptual illustration of software components of a remote system controller 124 according to some embodiments. The remote system controller 124 may be implemented on a computer system 200 such as described in relation to FIG. 2, including on a user computer system 102 (as part of a personal firewall) or on a server (as part of a network or other non-personal firewall). As described previously, the remote system controller 124 may communicate with the network stack 122 and may provide further control of access to data packets. The remote system controller 124 may include components to assist it with its functions, including a user interface module 302, a condition configuration module 304, a remote system listener 306, a store interface module 308, a condition analyzer 310, a remote system connector 312, a firewall interface module 320, and a firewall action manager 322. One of ordinary skill in the art will recognize that the functionality of each component of the remote system controller 124 may be combined or divided in any fashion and the description herein is merely intended to be illustrative of some embodiments.

The user interface module 302 may facilitate communication to and from a user, including transmitting and receiving requests and information with an administrator of the firewall 120 or a user of the user computer system 102. The condition configuration module 304 may establish remote system conditions for a particular application 112. In some embodiments, the condition configuration module 304 may set remote system conditions for a program 112 based on user input. In other embodiments, the condition configuration module 304 may set standard or default remote system conditions for a particular program 112, such as based on administrator preferences or application-provider preferences. The remote system listener 306 may receive information from a remote system 110 and may alternatively establish a connection with the remote system 110 as well as request remote system information. The store interface module 308 may facilitate communication to and from the remote system condition store 108, including storing an indication of remote system conditions for particular applications 112 in the remote system condition store 108 and accessing stored remote system conditions upon request of the condition analyzer 310.

The condition analyzer 310 may determine whether the remote system conditions for a program 112 are satisfied based on the information received from a remote system 110. To accomplish this task, the condition analyzer 310 may utilize remote system information received by the remote system listener 306 as well as remote system conditions established by the condition configuration module 304 and stored in the remote system condition store 108. The condition analyzer 310 may thus compare the stored remote system conditions with the current state of processes 114 of relevant remote systems 110 to "fine-tune" control of firewall 120. Results of the comparison may be passed to the firewall action manager 322 for firewall control.

After the comparison has been made, the firewall action manager 322 may then perform various firewall actions in response to the comparison, such as by allowing or denying data access, monitoring data packets, or redirecting data packets to another device. Allowing or denying data access may be performed for part or all of traffic (either incoming or outgoing or both) for a program 112. Redirection of data (also known as port forwarding when data packets are forwarded to and from a specific port number) may also be used by the firewall action manager 322 as one of its actions. The firewall action manager 322 may thus react to the processes 114 of remote systems 110 by restricting data packets in some fashion either when certain processes are not running (e.g., up-to-date virus software) or are running (e.g., resource-intensive applications). The firewall interface module 320 may serve as the interface between the remote system controller 124 and the other components of the firewall 120, such as the network stack 122.

Figure 4:
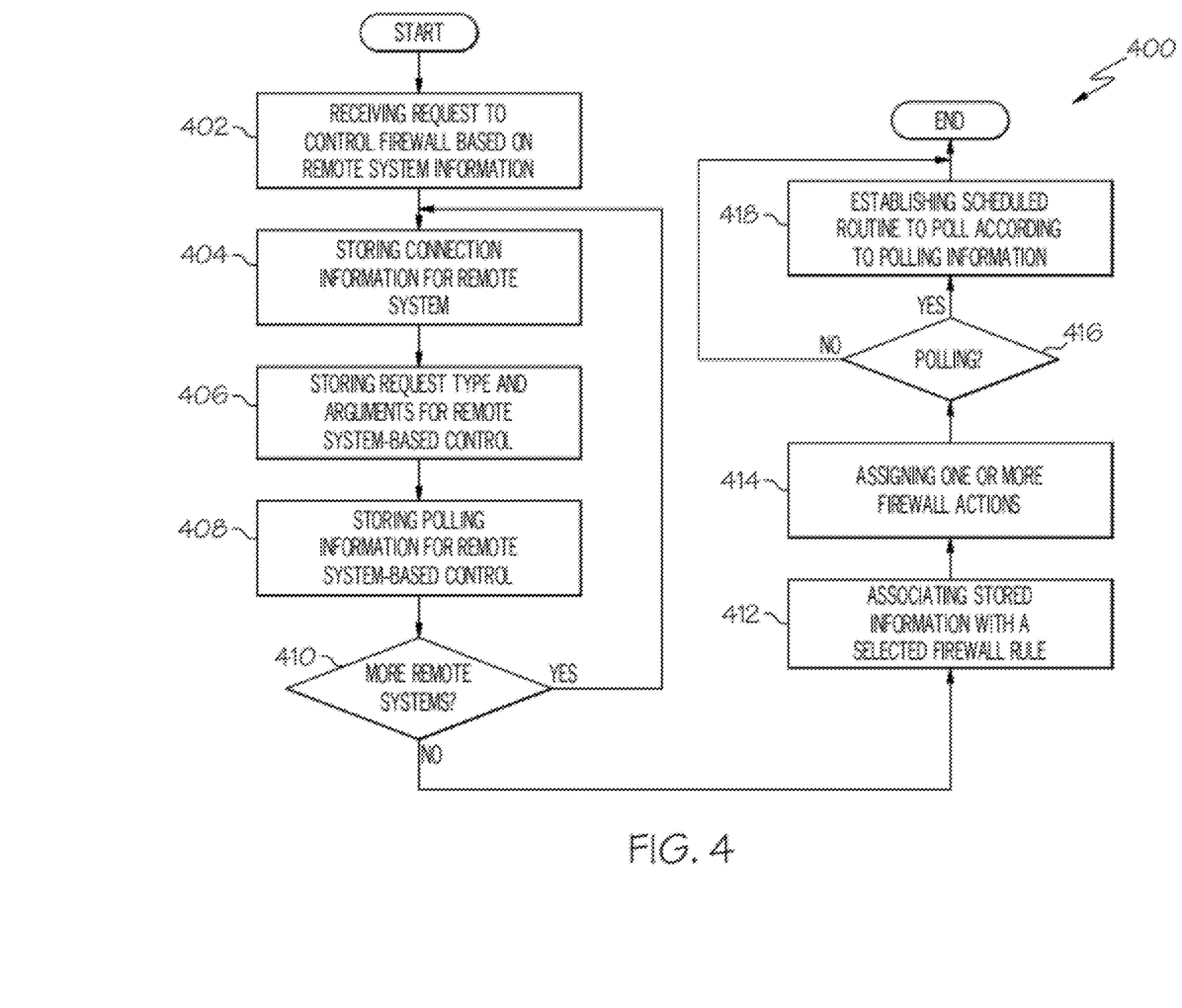
FIG. 4 depicts an example of a flow chart for configuring control of a firewall for particular programs according to some embodiments.

FIG. 4 depicts an example of a flow chart 400 for configuring control of a firewall for particular programs according to some embodiments. The method of flow chart 400 may be performed, in one embodiment, by components of the remote system controller 124 such as the condition configuration module 304. Flow chart 400 begins with element 402, receiving a request to control a particular program 112 via the firewall 120 based on remote system information. The request may originate from a user, from a network administrator or firewall administrator, be based on predetermined standards for performing control, or other fashion.

At element 404, the remote system controller 124 may store connection information for the remote system 110. Connection information may include any information that may facilitate connection to the remote system 110, including connection type (such as via mapping a network drive, FTP, web service request, etc.), connection port (such as 21 for FTP, 80 or 443 for web service, 139 for mapping a network drive, etc.), or credentials (such as user name, password, PIN, etc.). The remote system controller 124 may also at element 406 store request type and arguments for remote system-based control. In one embodiment, request types may be predefined at the receiving firewall 120 or listening service and must therefore be matched. For example, a firewall 120 may make a request type such as "WASStatus server1" to request status of a "server1" instance on a remote IBM WebSphere® server 110. In another embodiment, the requesting firewall 120 may use a syntax to define their own requests to make, such as by "getRegistry HKLM\SOFTWARE\ . . . \CurrentVersion\ServiceLevel" to request a registry read of a string within a key with the Microsoft Windows Registry. This embodiment may provide greater access to discover information and may therefore be restricted by authentication credentials.

At element 408, the remote system controller 124 may also store any polling information for remote system-based control. Polling information may be any information related to scheduled polling of a remote system 110, such as how often to send a request or whether to verify on first data request to a program 112 since operating system boot. At decision block 410 the remote system controller 124 may determine whether more remote systems 110 will be associated with the program 112 to be controlled and, if so, elements 404 through 408 may be repeated as necessary. The information from elements 404 through 408 may be stored in a remote system condition associated with the particular program 112 to be controlled.

At element 412, the remote system controller 124 may associate the stored information with a selected firewall rule and store an indication of the selected rule or association in the remote system condition. In some embodiments, the information to be stored in the remote system condition may be included in the request of element 402 or may alternatively be received at a different time. A user may associate the stored information with a firewall rule, for example, in any fashion, such as by selecting from a list of currently running processes 114, selecting from a list of executables provided by an administrator, or other methodology. Similarly, the remote system controller 124 may at element 414 assign one or more firewall actions to be performed if the remote system conditions are satisfied (or, optionally, are not satisfied). The particular firewall actions may be included in the request to control the program 112, may be received from a user or administrator, or other source. An indication of the firewall actions may also be stored in the remote system condition.

The remote system condition store 108 may thus include remote system conditions for different programs 112 of the user computer system 102 and, for multi-user systems, individual or group process rules for different user/program combinations.

After the remote system condition is configured and stored, the remote system controller 124 may determine at decision block 416 whether any polling of the remote system 110 will occur. If polling of the remote system 110 will occur, the method of flow chart 400 may continue to element 418, where the remote system controller 124 may establish a scheduled routine to poll according to polling information stored at element 408, after which the method may terminate. The remote system controller 124 may therefore establish a configurable routine for acquiring information from the remote system 110.

Figure 5:
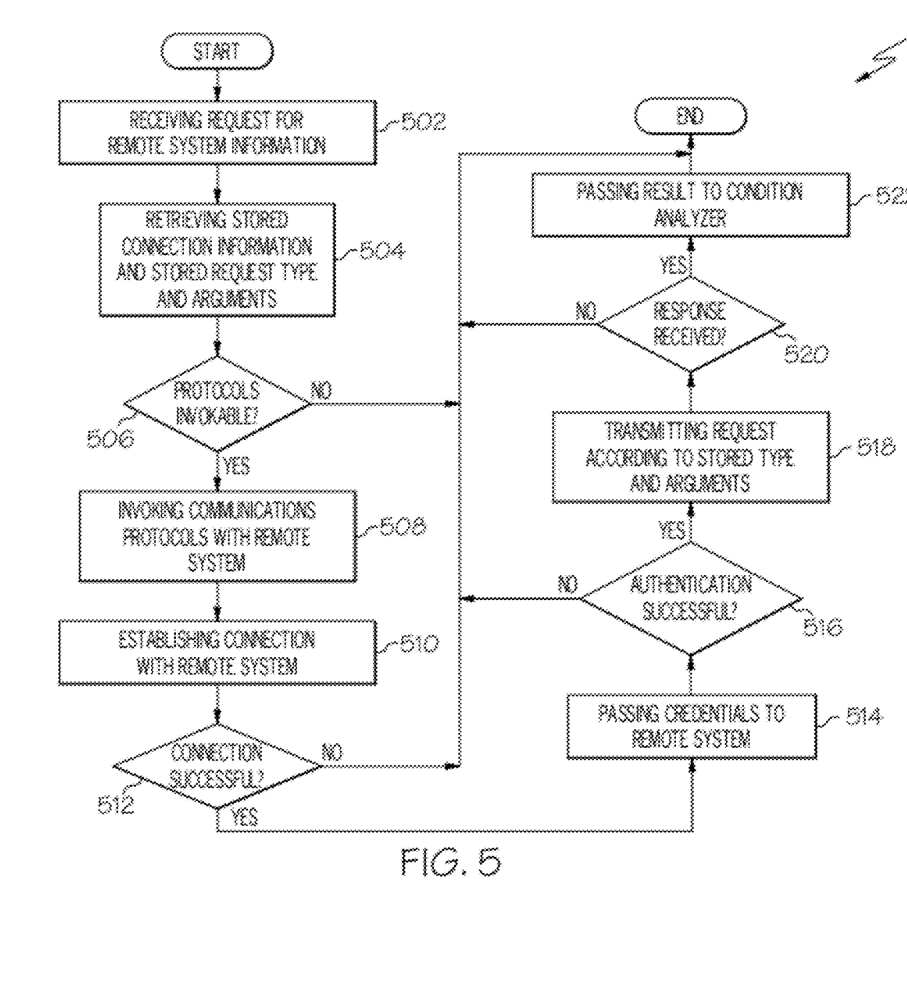
FIG. 5 depicts an example of a flow chart for establishing a connection with a remote system and providing remote system information according to some embodiments.

FIG. 5 depicts an example of a flow chart 500 for establishing a connection with a remote system 110 and providing remote system information according to some embodiments. The method of flow chart 500 may be performed, in one embodiment, by components of the remote system controller 124 such as the remote system listener 306. Flow chart 500 begins with element 502, receiving a request for remote system information. The request for remote system information may be received, for example, at a polling interval or may be received upon request, such as a request from a condition analyzer 310.

After receiving the request, the remote system controller 124 may retrieve stored connection information and any stored request type and arguments, such as those stored at elements 404 and 406 of flow chart 400. If the communication protocols according to the stored connection information are determined to be invokable at decision block 506, the method may continue to element 508. If the communication protocols are not invokable, the remote system controller 124 may log or display an alert and then exit the method. This error may occur, for example, if no network connection exists with the remote system 110 or if the network protocol is absent. If the protocols are invokable, the remote system controller 124 may at element 508 invoke the communication protocols with the remote system 110 and at element 510 establish a connection with the remote system 110 and wait for a reply. At decision block 512, the remote system controller 124 may determine if the connection is successful. If the connection did not succeed before a time-out, the remote system controller 124 may log or display an alert and exit the method. This error may occur, for example, in the event of a remote system 110 being down, a network outage, or a listening firewall/service being down.

If the connection succeeded, the remote system controller 124 may pass any required credentials to the remote system 110 at element 514. If the credentials were authenticated before a time-out at decision block 516 (or if no credentials were required), the remote system controller 124 may transmit the request according to the stored type and arguments at element 518. If the credentials were not authenticated at decision block 516, the remote system controller 124 may log or display an alert and exit the method. This type of error may occur, for example, if the credentials were incorrect.

If the request to the remote system was transmitted at element 518, the remote system controller 124 may at decision block 520 determine if a response was received from the remote system 110 before a time-out. If no response was received, the remote system controller 124 may either re-attempt transmission or log an error message and terminate. Such an error may occur, for example, due to processing complexity of request or some problem with the listening/firewall service. If a response was received, the method may then at element 522 pass the result (the received remote system information) to the condition analyzer 310 for analysis of whether the condition was met or not, after which the method may terminate.

Figure 6:
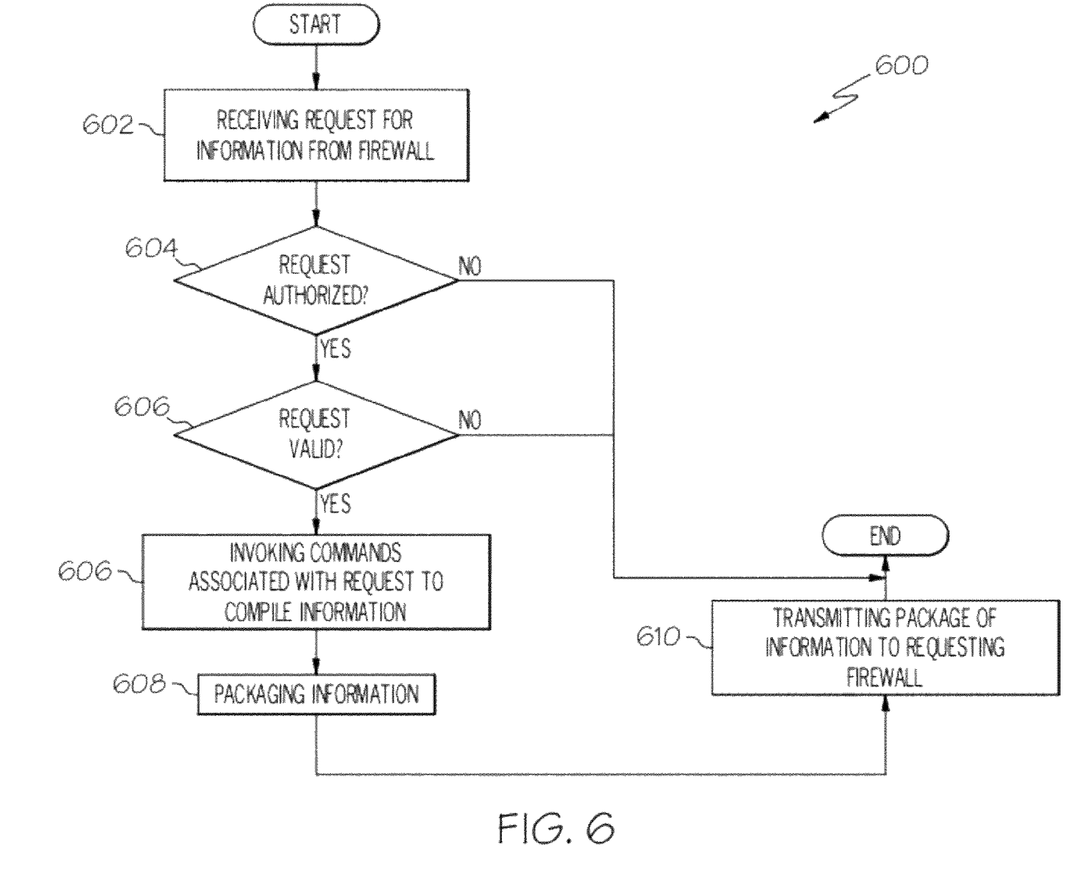
FIG. 6 depicts an example of a flow chart for handling a request from a firewall for information according to some embodiments.

FIG. 6 depicts an example of a flow chart 600 for handling a request from a firewall 120 for information according to some embodiments. The method of flow chart 600 may be performed, in one embodiment, by components of the remote system controller 124 such as the remote system listener 306. As will be described in more detail, the method of flow chart 600 may allow a component to listen such that the component may receive queries form firewalls 120 and send back information to the requesting firewall 120. Flow chart 600 begins with element 602, receiving a request for information from the firewall 120.

After receiving the request, the remote system controller 124 may determine if the request is authorized at decision block 604. If the request is not authorized, the method may respond with authorization failure and exit the method. For example, authorization may include an authentication routine (such as user name and password established in the firewall or rely on the IP address or MAC address of the computer with the requesting firewall). In another example, the authorization may accept anonymous queries for some or all request types. In some embodiments, the authentication may be performed by the network connection processing server request rather than or in addition to the firewall 120. If the request is authorized, the remote system controller 124 may determine at decision block 606 whether the request is valid. If the request is not valid, the method may respond with an invalid request and exit.

After determining that the request is authorized and valid, the remote system controller 124 may at element 606 invoke any commands associated with the request to compile information. At element 608, the remote system controller 124 may package the information based on an agreed-to format, such as XML or comma separated values (CSV). The request may optionally include an argument specifying which format type and any format parameters to use. At element 610, the remote system controller 124 may transmit the package of information to the requesting firewall 120, after which the method may terminate.

Figure 7:
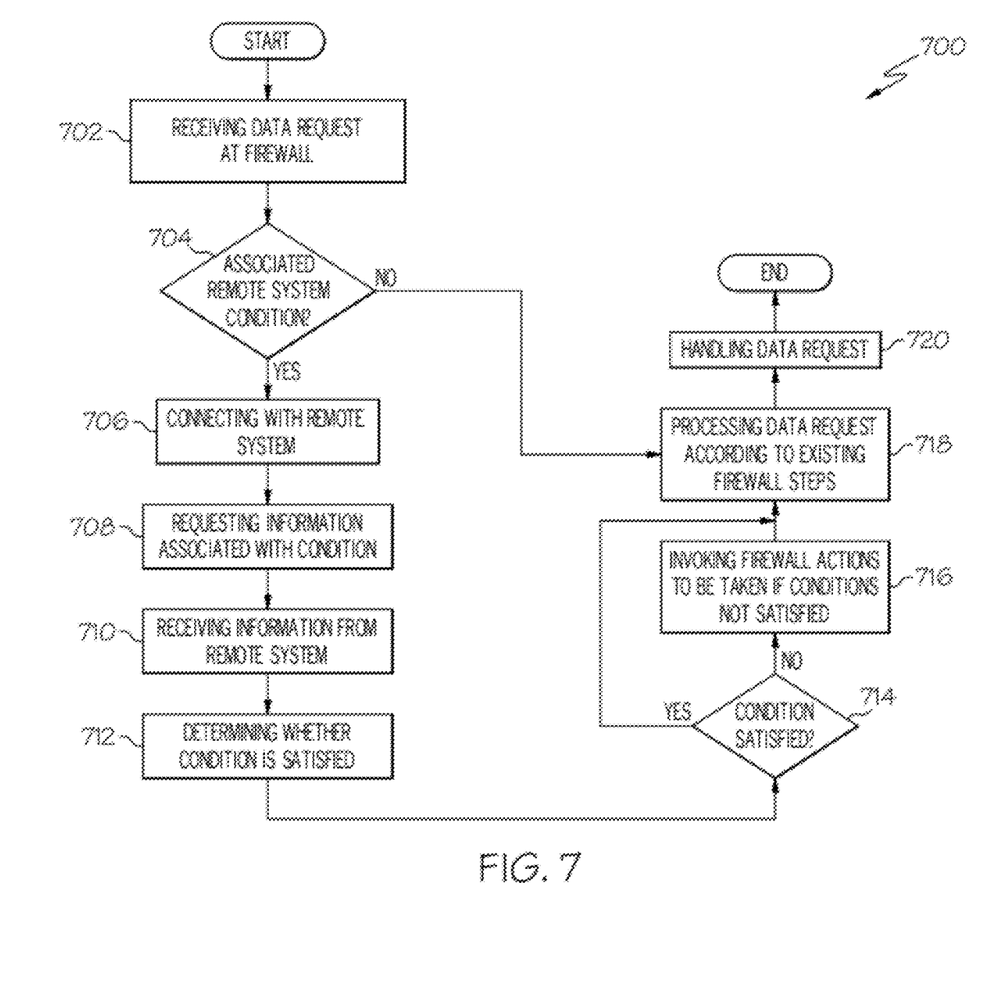
FIG. 7 depicts an example of a flow chart for controlling a firewall based on remote system information according to some embodiments.

FIG. 7 depicts an example of a flow chart 700 for controlling a firewall 120 based on remote system information according to some embodiments. The method of flow chart 700 may be performed, in one embodiment, by components of the firewall 120, such as the remote system controller 124 and its components. Flow chart 700 begins with element 702, receiving a data request at a firewall 120. In one embodiment, element 702 may include the remote system controller 124 receiving an indication of a received data packet from the network stack 122. The data request may include a data packet and an indication of a particular program 112 that is transmitting or receiving the data packet and is thus associated with the data request.

After receiving a data request, the remote system controller 124 may at decision block 704 determine whether one or more remote system conditions exist for the program 112 associated with the data request. If no remote system conditions exist, the firewall 120 (and its network stack 122) may process the data request according to existing firewall steps at element 718 and handle the data request at element 720, after which the method may terminate or return to element 702 for further processing. The existing firewall rules may thus exist in conjunction with the firewall actions of method 700. Element 718 may optionally be performed before or simultaneously with the other elements of method 700 that utilize the firewall actions based on remote system information. In some embodiments, for example, element 718 may be performed in parallel in a parallel processing architecture with other elements of method 700. In yet other embodiments, the different elements may be implemented as separate threads run synchronously, where a failed condition in any thread may trigger cancellation of other threads. At element 720 the data request may be allowed, denied, or partially allowed according to the firewall rules.

If a remote system condition exists for the associated program 112, the remote system controller 124 may at element 706 optionally connect with the remote system 110 that is associated with the remote system condition. At element 708, the remote system controller 124 may request information associated with the condition from the remote system 110, as described previously. The remote system controller 124 (and its remote system listener 306) may at element 710 receive the requested information from the remote system 110. At element 712, the remote system controller 124 may determine whether the remote system condition is satisfied based on the received remote system information. If any remote system conditions are not satisfied at decision block 714, the remote system controller 124 may at element 716 invoke one or more firewall actions to be taken if the conditions are not satisfied. The firewall 120 may then process the data request according to existing firewall steps at element 718 and handle the data request at element 720, as described previously. The method of flow chart 700 may thus provide for improved control of a firewall 120 by facilitating control of data flow on a program-by-program basis based on remote system information.

It will be apparent to those skilled in the art having the benefit of this disclosure that the present invention contemplates methods, systems, and media for implementing a firewall control system responsive to remote system information. It is understood that the form of the invention shown and described in the detailed description and the drawings are to be taken merely as examples. It is intended that the following claims be interpreted broadly to embrace all the variations of the example embodiments disclosed.

What is claimed is:

1. A method for controlling a firewall for a user computer system, said method comprising:
   one or more processors of the user computer system receiving a control request to control a program of the user computer system by the firewall, said control request comprising a condition pertaining to at least one process of a remote computer system, said at least one process configured to be executed on the remote computer system, said firewall configured to protect the user computer system from external threats;
   said one or more processors storing a remote system condition associated with the program of the user computer system, said remote system condition comprising the condition pertaining to the at least one process utilizing more than a specified percentage of CPU resources of the remote computer system;
   said one or more processors ascertaining whether the remote system condition is satisfied; and
   said one or more processors directing the firewall to allow or block a transmission of data if said ascertaining ascertains that the remote system condition is not satisfied or satisfied, respectively.

2. The method of claim 1, said method further comprising:
   said one or more processors requesting, from the remote computer system, information indicating a current state of the at least one process of the remote computer system,
   wherein said ascertaining whether the remote system condition is satisfied based on a comparison of the information indicating the current state of the at least one process with the condition pertaining to the at least one process.

3. The method of claim 2, said method further comprising:
   said one or more processors receiving a data request for said transmission of data from or to the program of the user computer system to or from the remote computer system, respectively,
   wherein said requesting information is in response to said receiving the data request.

4. The method of claim 1, wherein the condition pertaining to the at least one process comprises a condition of the at least one process utilizing more than a specified percentage of CPU resources of the remote computer system.

5. The method of claim 1, wherein the condition pertaining to the at least one process comprises a condition of a spam blocker or a virus scanner not running on the remote computer system.

6. The method of claim 1, wherein the condition pertaining to the at least one process comprises a condition of at least one server program process not running on the remote computer system.

7. The method of claim 1, wherein the condition pertaining to the at least one process comprises a condition of a game application running on the remote computer system.

8. The method of claim 1, said method further comprising:
   prior to said storing the remote system condition, said one or more processors configuring the remote system condition for the program of the user computer system such that the remote system condition is specific to the program of the user computer system.

9. The method of claim 1, wherein the remote system condition further comprises a condition of the transmission of data being a transmission of data of a specified protocol.

10. The method of claim 1, said method further comprising:
    specifying a direction of data flow as being either inbound or outbound with respect to the user computer system, wherein the remote system condition further comprises a condition of the transmission of data being a transmission of data in the specified direction of data flow.

11. A computer program product, comprising one or more computer-readable tangible storage devices and computer-readable program instructions which are stored on the one or more storage devices and are configured to be executed by one or more processors of a user computer system to perform a method for controlling a firewall for the user computer system, said method comprising:
    said one or more processors of the user computer system receiving a control request to control a program of the user computer system by the firewall, said control request comprising a condition pertaining to at least one process of a remote computer system, said at least one process configured to be executed on the remote computer system, said firewall configured to protect the user computer system from external threats;
    said one or more processors storing a remote system condition associated with the program of the user computer system, said remote system condition comprising the condition pertaining to the at least one process utilizing more than a specified percentage of CPU resources of the remote computer system;

said one or more processors ascertaining whether the remote system condition is satisfied; and said one or more processors directing the firewall or allow or block a transmission of data if said ascertaining ascertains that the remote system condition is not satisfied or satisfied, respectively.

12. The computer program product of claim 11, said method further comprising:

said one or more processors requesting, from the remote computer system, information indicating a current state of the at least one process of the remote computer system, wherein said ascertaining whether the remote system condition is satisfied based on a comparison of the information indicating the current state of the at least one process with the condition pertaining to the at least one process.

13. The computer program product of claim 12, said method further comprising:

said one or more processors receiving a data request for said transmission of data from or to the program of the user computer system to or from the remote computer system, respectively, wherein said requesting information is in response to said receiving the data request.

14. The computer program product of claim 11, wherein the condition pertaining to the at least one process comprises a condition of at least one server program process not running on the remote computer system.

15. The computer program product of claim 11, wherein the condition pertaining to the at least one process comprises a condition of a spam blocker or a virus scanner not running on the remote computer system.

16. A user computer system, comprising one or more processors, one or more computer-readable memories, one or more computer-readable tangible storage devices, and program instructions which are stored on the one or more storage devices for execution by the one or more processors via the one or more memories to perform a method for controlling a firewall for the user computer system, said method comprising:

said one or more processors of the user computer system receiving a control request to control a program of the user computer system by the firewall, said control request comprising a condition pertaining to at least one process of a remote computer system, said at least one process configured to be executed on the remote computer system, said firewall configured to protect the user computer system from external threats;

said one or more processors storing a remote system condition associated with the program of the user computer system, said remote system condition comprising the condition pertaining to the at least one process utilizing more than a specified percentage of CPU resources of the remote computer system;

said one or more processors ascertaining whether the remote system condition is satisfied; and said one or more processors directing the firewall or allow or block a transmission of data if said ascertaining ascertains that the remote system condition is not satisfied or satisfied, respectively.

17. The user computer system of claim 16, said method further comprising:

said one or more processors requesting, from the remote computer system, information indicating a current state of the at least one process of the remote computer system, wherein said ascertaining whether the remote system condition is satisfied based on a comparison of the information indicating the current state of the at least one process with the condition pertaining to the at least one process.

18. The user computer system of claim 17, said method further comprising:

said one or more processors receiving a data request for said transmission of data from or to the program of the user computer system to or from the remote computer system, respectively, wherein said requesting information is in response to said receiving the data request.

19. The user computer system of claim 16, wherein the condition pertaining to the at least one process comprises a condition of at least one server program process not running on the remote computer system.

20. The user computer system of claim 16, wherein the condition pertaining to the at least one process comprises a condition of a spam blocker or a virus scanner not running on the remote computer system.

* * * * *